US012555783B2

United States Patent
Nambuya et al.

(10) Patent No.: US 12,555,783 B2
(45) Date of Patent: Feb. 17, 2026

(54) NEGATIVE ELECTRODE FOR NONAQUEOUS ELECTROLYTE SECONDARY BATTERIES, AND NONAQUEOUS ELECTROLYTE SECONDARY BATTERY

(71) Applicant: Panasonic Intellectual Property Management Co., Ltd., Osaka (JP)

(72) Inventors: Shunsuke Nambuya, Osaka (JP); Norihisa Yamamoto, Osaka (JP); Masahiro Soga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 672 days.

(21) Appl. No.: 17/912,714

(22) PCT Filed: Mar. 25, 2021

(86) PCT No.: PCT/JP2021/012471
§ 371 (c)(1),
(2) Date: Sep. 19, 2022

(87) PCT Pub. No.: WO2021/200529
PCT Pub. Date: Oct. 7, 2021

(65) Prior Publication Data
US 2023/0216042 A1      Jul. 6, 2023

(30) Foreign Application Priority Data

Mar. 31, 2020 (JP) ................................ 2020-062358

(51) Int. Cl.
*H01M 4/485* (2010.01)
*H01M 4/131* (2010.01)
(Continued)

(52) U.S. Cl.
CPC ........... *H01M 4/485* (2013.01); *H01M 4/131* (2013.01); *H01M 4/625* (2013.01); *H01M 2004/021* (2013.01); *H01M 2004/027* (2013.01)

(58) Field of Classification Search
CPC ...... H01M 4/485; H01M 4/131; H01M 4/625; H01M 2004/021; H01M 2004/027;
(Continued)

(56) References Cited

U.S. PATENT DOCUMENTS

| 2016/0087267 A1 | 3/2016 | Yoshio et al. |
| 2020/0058924 A1* | 2/2020 | Pang ..................... H01M 4/386 |

(Continued)

FOREIGN PATENT DOCUMENTS

| JP | 2016-48698 A | 4/2016 |
| JP | 2016-62860 A | 4/2016 |

(Continued)

OTHER PUBLICATIONS

International Search Report dated Apr. 27, 2021, issued in counterpart International Application No. PCT/JP2021/012471 (3 pages).

*Primary Examiner* — Cynthia K Walls
(74) *Attorney, Agent, or Firm* — WHDA, LLP

(57) ABSTRACT

This negative electrode for nonaqueous electrolyte secondary batteries is provided with a negative electrode mixture layer that contains a negative electrode active material and carbon nanotubes. The negative electrode active material contains a first negative electrode active material and a second negative electrode active material; the first negative electrode active material and the second negative electrode active material contain lithium silicate phases, each of which contains lithium, silicon and oxygen, and silicon particles that are dispersed in the lithium silicate phases; the molar ratios of oxygen to silicon (O/Si) in the lithium silicate
(Continued)

phases are different from each other; the carbon nanotubes have a diameter of from 1 nm to 5 nm; and the ratio of the mass of the first negative electrode active material relative to the total mass of the first negative electrode active material and the second negative electrode active material is 60% or less.

11 Claims, 1 Drawing Sheet

(51) Int. Cl.
*H01M 4/62* (2006.01)
*H01M 4/02* (2006.01)

(58) Field of Classification Search
CPC ........ H01M 4/136; H01M 4/362; H01M 4/58; H01M 4/1397; H01M 4/5825; Y02E 60/10
See application file for complete search history.

(56) References Cited

U.S. PATENT DOCUMENTS

| | | | |
|---|---|---|---|
| 2020/0350563 A1 | 11/2020 | Uchiyama et al. | |
| 2021/0020907 A1* | 1/2021 | Kim | H01M 4/1393 |
| 2021/0313564 A1 | 10/2021 | Nambuya et al. | |

FOREIGN PATENT DOCUMENTS

| | | |
|---|---|---|
| JP | 2016-110876 A | 6/2016 |
| JP | 2019-160724 A | 9/2019 |
| WO | 2019/130787 A1 | 7/2019 |
| WO | 2020/031869 A1 | 2/2020 |

* cited by examiner

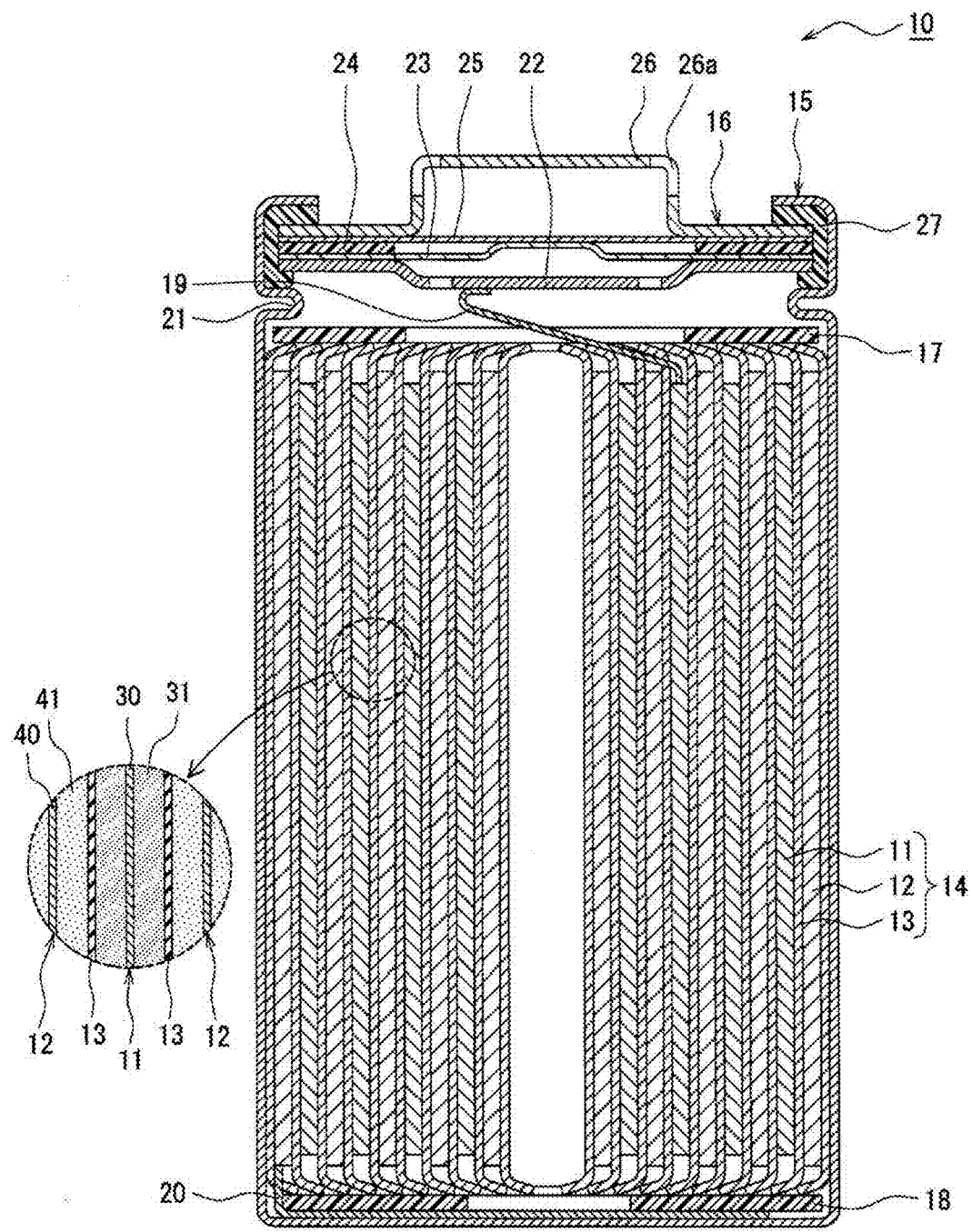

NEGATIVE ELECTRODE FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2021/012471 filed on Mar. 25, 2021 which claims the benefit of priority under 35 U.S.C. § 119(a) of Japanese Patent Application No. 2020-062358 filed in Japan on Mar. 31, 2020, the contents of which are incorporated herein by reference.

TECHNICAL FIELD

The present disclosure relates to a negative electrode for non-aqueous electrolyte secondary batteries and a non-aqueous electrolyte secondary battery.

BACKGROUND

Silicon-based materials that can occlude and release a larger amount of lithium ions than carbon materials such as graphite do are being considered as a negative electrode active material for a high-capacity secondary battery. However, silicon-based materials have a problem in that the volume changes significantly in conjunction with occlusion and release of lithium ions, resulting in disconnection of an electric conduction path within a negative electrode mixture layer due to repeated charging and discharging, which causes degradation of cycle characteristics of the secondary battery. Patent Literature 1 discloses a secondary battery including a negative electrode mixture layer that contains carbon nanotubes having a predetermined size at a percentage of 0.1% to 2% by mass, thereby achieving improved cycle characteristics.

CITATION LIST

Patent Literature

Patent Literature 1: Japanese Unexamined Patent Application Publication No. 2016-110876

SUMMARY

As the secondary battery disclosed in Patent Literature 1 includes a negative electrode mixture layer with a high content of carbon nanotubes, the carbon nanotubes having a large diameter, the initial discharge capacity may decrease even if cycle characteristics are improved. Patent Literature 1 still has room for improvement as no consideration has been given to seeking improvements in both the initial discharge capacity and the cycle characteristics at the same time.

According to an aspect of the present disclosure, there is provided a negative electrode for non-aqueous electrolyte secondary batteries comprising a negative electrode current collector, and a negative electrode mixture layer formed on a surface of the negative electrode current collector, the negative electrode mixture layer containing a negative electrode active material and carbon nanotubes. The negative electrode active material comprises a first negative electrode active material and a second negative electrode active material. The first negative electrode active material comprises a first lithium silicate phase containing lithium, silicon, and oxygen, and first silicon particles dispersed in the first lithium silicate phase, satisfying a relationship $2<A1\leq 3$, where A1 represents the molar ratio of oxygen to silicon (O/Si) in the first lithium silicate phase. The second negative electrode active material comprises a second lithium silicate phase containing lithium, silicon, and oxygen, and second silicon particles dispersed in the second lithium silicate phase, satisfying a relationship $3<A2\leq 4$, where A2 represents the molar ratio of oxygen to silicon (O/Si) in the second lithium silicate phase. The carbon nanotubes have a diameter of 1 nm to 5 nm. The mass percentage of the first negative electrode active material relative to the total mass of the first negative electrode active material and the second negative electrode active material is 60% or less.

According to an aspect of the present disclosure, there is provided a non-aqueous electrolyte secondary battery comprising the negative electrode for non-aqueous electrolyte secondary batteries; a positive electrode containing a positive electrode active material; and a non-aqueous electrolyte.

An aspect of the present disclosure enables improved cycle characteristics while increasing the initial discharge capacity of the secondary battery.

BRIEF DESCRIPTION OF DRAWINGS

The FIGURE is a vertical cross-sectional view of a non-aqueous electrolyte secondary battery according to an example embodiment.

DESCRIPTION OF EMBODIMENTS

As described above, silicon-based materials serve as a negative electrode active material that is capable of increasing the capacity of secondary batteries, but may present an issue in that charging/discharging cycles lower the discharge capacity because charging and discharging cause significant changes in volume. In a method comprising containing a large amount of carbon nanotubes as a conductive aid in a negative electrode mixture layer as disclosed in Patent Literature 1 to maintain an electric conduction path even after charging/discharging cycles, the content of the negative electrode active material in the negative electrode mixture layer decreases; therefore, the initial discharge capacity may decrease even if cycle characteristics can be improved. Negative electrode mixture slurry that contains a large amount of large-diameter carbon nanotubes as described in Patent Literature 1 may impair dispersibility. However, among silicon-based materials, a negative electrode active material including silicon particles in a lithium silicate phase that contains lithium, silicon, and oxygen can occlude and release a large amount of lithium ions, but may become cracked by charging/discharging cycles, so that a side reaction such as a reaction with an electrolyte occurs easily, which easily leads to a decrease in cycle characteristics. Given these circumstances, the present inventors made diligent efforts to solve the above-described problems and as a result, prepared two types of particles each including a lithium silicate phase with silicon particles dispersed therein and found that the combined use of a negative electrode active material comprising these two types of particles mixed at appropriate percentages and carbon nanotubes having relatively small diameters distinctively enables improved cycle characteristics while increasing the initial discharge capacity of the secondary battery.

An example embodiment of a non-aqueous electrolyte secondary battery according to the present disclosure will now be described in detail. Although a cylindrical battery including a wound electrode assembly housed in an outer housing having a cylindrical shape is described below by way of example, the electrode assembly is not limited to those having a wound configuration and may be a laminated electrode assembly including multiple positive electrodes and multiple negative electrodes alternately laminated one over another with a separator therebetween. The outer housing is not limited to those having a cylindrical shape and may have, for example, a rectangular, coin, or another shape, and the outer housing may be a battery case composed of a laminate sheet including a metal layer and a resin layer.

The FIGURE is a vertical cross-sectional view of a cylindrical secondary battery 10 according to an example embodiment. The secondary battery 10 illustrated in the FIGURE includes an electrode assembly 14 and a non-aqueous electrolyte that are housed in an outer housing 15. The electrode assembly 14 has a wound configuration in which a positive electrode 11 and a negative electrode 12 are wound with a separator 13 therebetween. In the following description, for ease of description, the term "upper" refers to the side toward a sealing assembly 16, and the term "lower" refers to the side toward the bottom of the outer housing 15.

An upper open end of the outer housing 15 is closed by the sealing assembly 16, thereby hermetically sealing the space inside the secondary battery 10. Insulating plates 17 and 18 are respectively provided on upper and lower sides of the electrode assembly 14. A positive electrode lead 19 passes through a through hole in the insulating plate 17 and extends toward the upper side, and is welded to the lower surface of a filter 22 which is the bottom plate of the sealing assembly 16. For the secondary battery 10, a cap 26, which is the top plate of the sealing assembly 16 electrically connected to the filter 22, serves as a positive electrode terminal. On the other hand, a negative electrode lead 20 passes outside the insulating plate 18 and extends toward the bottom of the outer housing 15, and is welded to the inner surface of the bottom of the outer housing 15. For the secondary battery 10, the outer housing 15 serves as a negative electrode terminal.

The outer housing 15 is, for example, a metal outer can having a cylindrical shape with a closed bottom. A gasket 27 is provided between the outer housing 15 and the sealing assembly 16, thereby maintaining airtightness of the space inside the secondary battery 10. The outer housing 15 has a groove or inward projection 21 for supporting the sealing assembly 16, the groove or inward projection 21 being formed by, for example, pressing the side surface of the outer housing 15 from the outside. The groove or inward projection 21 preferably has an annular shape extending along the circumference of the outer housing 15, and supports the sealing assembly 16 on its upper surface with the gasket 27 therebetween.

The sealing assembly 16 includes the filter 22, a lower vent member 23, an insulating member 24, an upper vent member 25, and the cap 26 that are stacked in that order from the side on which the electrode assembly 14 is located. The components of the sealing assembly 16 have, for example, either a disc shape or a ring shape and are, except for the insulating member 24, electrically connected to each other. The lower vent member 23 and the upper vent member 25 are connected to each other at their center portions, and the insulating member 24 is interposed between their peripheral portions. In response to an increase in internal pressure of the battery due to abnormal heat generation, for example, the lower vent member 23 breaks, resulting in an interruption of electrical connection between the lower vent member 23 and the upper vent member 25 as the upper vent member 25 expands toward the cap 26 and moves apart from the lower vent member 23. In response to a further increase in internal pressure, the upper vent member 25 breaks, letting gas escape through an opening 26a of the cap 26.

The positive electrode 11, the negative electrode 12, the separator 13, and the non-aqueous electrolyte of the secondary battery 10, and, in particular, a negative electrode mixture layer 41 of the negative electrode 12 will be described in detail below.

[Positive Electrode]

The positive electrode 11 includes a positive electrode current collector 30 and a positive electrode mixture layer 31 that is formed on a surface of the positive electrode current collector 30. Examples of the positive electrode current collector 30 include foil of metal that is stable in an electric potential range of the positive electrode 11, such as aluminum, and a film having such metal disposed in its surface layer. The positive electrode mixture layer 31 may contain, for example, a positive electrode active material, a binder, and a conductive agent. The positive electrode 11 can be prepared by, for example, applying positive electrode mixture slurry containing, for example, a positive electrode active material, a binder, and a conductive agent to the surface of the positive electrode current collector 30, drying the applied film, and then compressing it to form positive electrode mixture layers 31 on both sides of the positive electrode current collector 30.

The positive electrode active material contained in the positive electrode mixture layer 31 may contain a lithium transition metal oxide as the main component. The positive electrode active material may be substantially composed only of a lithium transition metal oxide or may be obtained by adhering, for example, inorganic compound particles to the surfaces of lithium transition metal oxide particles. A type of lithium transition metal oxide may be used alone, or two or more types of lithium transition metal oxides may be used in combination.

The lithium transition metal oxide can be an oxide represented by a general formula $Li_aNi_xCo_yMi_{1-x-y}O_{2-b}$ (where $0.97 \leq a \leq 1.2$, $0.8 \leq x \leq 1.0$, $0 \leq y \leq 0.1$, $0 \leq b < 0.05$, and M includes at least one element selected from Ca, Mn, Al, B, W, Sr, Mg, Mo, Nb, Ti, Si, and Zr).

Examples of the conductive agent contained in the positive electrode mixture layer 31 include carbon materials such as carbon black (CB), acetylene black (AB), Ketjenblack, carbon nanotubes, carbon nanofiber, and graphite. One of these may be used alone, or two or more of these may be used in combination.

Examples of the binder contained in the positive electrode mixture layer 31 include polytetrafluoroethylene (PTFE), polyvinylidene fluoride (PVdF), and other fluorocarbon resins, polyacrylonitrile (PAN), polyimide resins, acrylic resins, and polyolefin resins. One of these may be used alone, or two or more of these may be used in combination.

[Negative Electrode]

The negative electrode 12 includes a negative electrode current collector 40 and the negative electrode mixture layer 41 that is formed on a surface of the negative electrode current collector 40. Examples of the negative electrode current collector 40 include foil of metal that is stable in an electric potential range of the negative electrode 12, such as copper, and a film having such metal disposed in its surface layer. The negative electrode mixture layer 41 contains a negative electrode active material and carbon nanotubes. The negative electrode 12 can be prepared by, for example, applying negative electrode mixture slurry containing, for example, a negative electrode active material and carbon nanotubes to the surface of the negative electrode current collector 40, drying the applied film, and then compressing it to form negative electrode mixture layers 41 on both sides of the negative electrode current collector 40.

The carbon nanotubes have a diameter of 1 nm to 5 nm and preferably 1 nm to 3 nm. The use of carbon nanotubes having such a relatively small diameter enables maintaining an electric conduction path through the negative electrode active material with a reduced content compared to the use of carbon nanotubes having a larger diameter; therefore, the content of the negative electrode active material in the negative electrode mixture layer 41 can be increased. The use of such carbon nanotubes also improves dispersibility of the negative electrode mixture slurry. The carbon nanotubes contained in the negative electrode mixture layer 41 may be, for example, single-walled carbon nanotubes.

The carbon nanotubes may have a length of 5 μm or greater. This enables improved electrical conductivity as the carbon nanotubes have a larger aspect ratio; therefore, an electric conduction path through the negative electrode active material can be maintained with a reduced content.

The negative electrode mixture layer 41 may have a mass percentage of the carbon nanotubes of 0.005% to 0.05% relative to the mass of the negative electrode active material. A mass percentage of the carbon nanotubes of 0.005% or greater can maintain an electric conduction path through the negative electrode active material and therefore provide good cycle characteristics. A mass percentage of the carbon nanotubes of 0.05% or less allows the negative electrode mixture layer 41 to contain an appropriate amount of the negative electrode active material and is therefore advantageous in terms of the discharge capacity.

The negative electrode mixture layer 41 may further contain a conductive aid other than carbon nanotubes. Examples of the conductive aid other than carbon nanotubes include carbon black (CB), acetylene black (AB), Ketjenblack, and carbon nanofiber. One of these may be used alone, or two or more of these may be used in combination. In terms of allowing the negative electrode mixture layer 41 to contain an appropriate amount of the negative electrode active material, the total mass of the conductive aid including carbon nanotubes is preferably 0.05% or less relative to the mass of the negative electrode active material contained.

The negative electrode mixture layer 41 may further contain a binder. As for the positive electrode 11, examples of the binder include fluorocarbon resins, PAN, polyimide resins, acrylic resins, and polyolefin resins. One of these may be used alone, or two or more of these may be used in combination. For the preparation of the negative electrode mixture slurry using an aqueous solvent, for example, carboxymethylcellulose (CMC) or a salt thereof, styrene-butadiene rubber (SBR), polyacrylic acid (PAA) or a salt thereof, or polyvinyl alcohol is preferably used in combination.

The negative electrode active material contained in the negative electrode mixture layer 41 includes a first negative electrode active material and a second negative electrode active material. The first negative electrode active material and the second negative electrode active material are both in the form of particles having a volume-based median diameter (D50) of, for example, 1 μm to 25 μm and preferably 4 μm to 15 μm. The D50 value can be reduced by pulverizing the negative electrode active material using a ball mill. D50 represents the particle diameter below which 50% of the frequency cumulative total lies in a volume-based particle size distribution. It is also called midpoint particle size. The particle size distribution of the negative electrode active material can be measured using a laser diffraction particle size distribution analyzer (for example, LA-750 from Horiba, Ltd.) with water as the dispersion medium.

The first negative electrode active material contains a first lithium silicate phase containing lithium, silicon, and oxygen, and first silicon particles dispersed in the first lithium silicate phase. The relationship 2<A1≤3 is satisfied, where A1 represents the molar ratio of oxygen to silicon (O/Si) in the first lithium silicate phase. It should be noted that the first negative electrode active material may contain a phase other than the first lithium silicate phase within the range in which it does not impair the purposes of the present disclosure, but in this embodiment, the first negative electrode active material contains only the first lithium silicate phase as the phase.

The first negative electrode active material may include a conductive layer that covers at least part of the surface. The conductive layer contains an electrically conductive material. This enables improved electrical conductivity of the first negative electrode active material. For example, a carbon material can be used as the electrically conductive material. It should be noted that the thickness of the conductive layer can be reduced to the extent that it does not affect the average particle size of the first negative electrode active material.

The first lithium silicate phase can be represented by, for example, a general formula $Li_2Si_xO_{2x+1}$ (x≥1). In terms of the stability or the lithium ion conductivity of the first lithium silicate phase, it is preferable that x satisfies the relationship 1≤x≤2. It should be noted that the relationship 0<B1≤2 may be satisfied, where B1 represents the molar ratio of lithium to silicon (Li/Si) in the first lithium silicate phase, or 1≤B1≤2 may hold.

The first lithium silicate phase may further contain at least one element selected from the group consisting of Na, K, Mg, Ca, Ba, Zr, Nb, Ta, V, Ti, P, Bi, Zn, Sn, Pb, Sb, Co, F, W, Al, La, and B. The content of these elements in the first lithium silicate phase is preferably an amount that does not influence the discharge capacity and may be, for example, 0.01 or less in molar ratio relative to the sum of Li, Si, and O in the first lithium silicate phase. The content of the above-described elements such as Na in the first lithium silicate phase can be measured by completely dissolving the negative electrode active material in hot hydrofluoric-nitric acid (heated acid mixture of hydrofluoric acid and nitric acid) followed by filtration to remove carbon from the dissolution residue, and then analyzing the obtained filtrate by inductively coupled plasma-atomic emission spectroscopy (ICP-AES).

The first silicon particles dispersed in the first lithium silicate phase reduce the volume change of the first negative electrode active material during charging and discharging. The first silicon particles may have a crystallite size of, for example, 10 nm or greater. This reduces the surface areas of the first silicon particles, enabling reduced degradation of the first silicon particles. The crystallite size of the first silicon particles is calculated using the Scherrer equation from the half-width of a diffraction peak attributed to the Si (111) plane in an X-ray diffraction (XRD) pattern of the first silicon particles.

The first silicon particles are aggregates of multiple crystallites. In terms of reducing cracks in the first silicon particles, the first silicon particles have an average particle size of preferably 500 nm or less, further preferably 200 nm or less, and particularly preferably 50 nm or less before the first time charging. After the first time charging, the first silicon particles have an average particle size of preferably 400 nm or less and further preferably 100 nm or less. By making the first silicon particles finer, the volume change during charging and discharging can be further reduced. The average particle size of the first silicon particles is determined by analyzing a cross-section SEM image obtained through observation of a cross section of the first negative electrode active material using a scanning electron microscope (SEM). Specifically, the grain boundaries of 100 primary particles randomly chosen from this cross-section SEM image are observed to identify the outer geometries of the primary particles, and then the longitudinal diameter (maximum diameter) of each of the 100 primary particles is determined to obtain an average value thereof as the average particle size of the first silicon particles.

To enhance the diffusibility of lithium ions for increased capacity, the content of the first silicon particles in the first negative electrode active material is, for example, preferably 30% or greater by mass, further preferably 50% or greater by mass, and particularly preferably 55% or greater by mass. However, to cover the surfaces of the first silicon particles with the first lithium silicate phase for reduced reaction between the liquid electrolyte and the first silicon particles, the content of the first silicon particles in the first negative electrode active material is, for example, preferably 95% or less by mass, further preferably 80% or less by mass, and particularly preferably 75% or less by mass.

The content of the first silicon particles can be measured using Si-NMR (INOVA-400 from Varian) under the following measurement conditions.
Probe: Varian 7 mm CPMAS-2
MAS: 4.2 kHz
MAS rate: 4 kHz
Pulse: DD (45° pulse+signal acquisition time 1H decoupling)
Repetition time: 1200 sec
Observation width: 100 kHz
Center of observation: approximately −100 ppm
Signal acquisition time: 0.05 sec
Number of times of integrations: 560
Sample amount: 207.6 mg The composition of the first lithium silicate phase $Li_2Si_xO_{2x+1}$ (x≥1) can be analyzed by, for example, the following method. It should be noted that, while the first lithium silicate phase described below does not contain any of the above-described elements such as Na, the calculation is performed after the contents of those elements such as Na, if contained, are subtracted beforehand.
(1) The mass of a sample of the first negative electrode active material is measured.
(2) The contents of carbon, oxygen, and lithium in the sample are calculated in the manner described below.
(3) The carbon content and the silicon content are subtracted from the mass of the sample, the contents of lithium and oxygen in the remaining amount are calculated, and the ratio of 2 to (2x+1) is determined from the molar ratio of lithium and oxygen to calculate the value x.

The carbon content in the sample can be measured using a carbon/sulfur analyzer (Model EMIA-520 available from Horiba, Ltd.). A magnetic board, on which a measured amount of the sample is placed and a combustion assistant is added, is inserted into a combustion furnace (with a carrier gas of oxygen) that is heated to 1350° C., and the amount of carbon dioxide gas generated during combustion is detected by infrared absorption. A calibration curve is prepared using, for example, carbon steel (with a carbon content of 0.49%) available from Bureau of Analysed Samples Ltd. to calculate the carbon content in the sample. The carbon content in the sample mostly comes from the conductive layer.

The oxygen content in the sample can be measured using an oxygen/nitrogen/hydrogen analyzer (Model EGMA-830 available from Horiba, Ltd.). The sample is placed in a Ni capsule, which is then introduced into a carbon crucible that is heated with a power of 5.75 kW together with Sn pellets and Ni pellets serving as flux to detect released carbon monoxide gas. A calibration curve is prepared using a standard sample $Y_2O_3$ to calculate the oxygen content in the sample.

The lithium content in the sample can be measured by completely dissolving the sample in hot hydrofluoric-nitric acid (heated acid mixture of hydrofluoric acid and nitric acid) followed by filtration to remove carbon from the dissolution residue, and then analyzing the obtained filtrate by inductively coupled plasma-atomic emission spectroscopy (ICP-AES). A calibration curve is prepared using a commercially available standard solution to calculate the lithium content in the sample.

The silicon content in the sample is obtained by subtracting the carbon content, the oxygen content, and the lithium content from the mass of the sample of the first negative electrode active material. The silicon content thus obtained include both forms of silicon that is present in the form of silicon particles and that is present in the form of lithium silicate. The content of silicon particles determined through the above-described Si-NMR measurement is subtracted from this silicon content, so that the content of silicon that is present in the form of lithium silicate can be determined.

The second negative electrode active material contains a second lithium silicate phase containing lithium, silicon, and oxygen, and second silicon particles dispersed in the second lithium silicate phase. The relationship 3<A2≤4 is satisfied, where A2 represents the molar ratio of oxygen to silicon (O/Si) in the second lithium silicate phase. It should be noted that the second negative electrode active material may contain a phase other than the second lithium silicate phase within the range in which it does not impair the purposes of the present disclosure, but in this embodiment, the second negative electrode active material contains only the second lithium silicate phase as the phase. The second negative electrode active material may include a conductive layer that covers at least part of the surface, the conductive layer containing an electrically conductive material such as a carbon material. It should be noted that the thickness of the conductive layer can be reduced to the extent that it does not affect the average particle size of the second negative electrode active material.

The second lithium silicate phase can be represented by, for example, a general formula $Li_2Si_yO_{2y+1}$ (y<1). It is preferable that y satisfies the relationship 0.55≤y<1. It should be noted that the relationship 2<B2≤4 may be satisfied, where B2 represents the molar ratio of lithium to silicon (Li/Si) in the second lithium silicate phase. The second lithium silicate phase may also contain, in addition to lithium, silicon, and oxygen, trace amounts of one or more elements such as Na that are given as examples above in connection with the first lithium silicate phase.

The second silicon particles dispersed in the second lithium silicate phase reduce the volume change of the second negative electrode active material during charging and discharging. The second silicon particles may have a crystallite size of, for example, 10 nm or greater. The second silicon particles are aggregates of multiple crystallites. In terms of reducing cracks in the second silicon particles, the second silicon particles have an average particle size of preferably 500 nm or less, further preferably 200 nm or less, and particularly preferably 50 nm or less before the first time charging. After the first time charging, the second silicon particles have an average particle size of preferably 400 nm or less and further preferably 100 nm or less.

In terms of increased capacity, the minimum content of the second silicon particles in the second negative electrode active material is, for example, preferably 30% by mass, further preferably 50% by mass, and particularly preferably 55% by mass. In terms of reduced side reaction, the maximum content of the first silicon particles in the first negative electrode active material is, for example, preferably 95% by mass, further preferably 80% by mass, and particularly preferably 75% by mass. The content of the second silicon particles can be measured in a similar manner as for the content of the first silicon particles. Also, the composition of the second lithium silicate phase can be calculated in a similar manner as for the composition of the first lithium silicate phase.

Before the initial charge, the second negative electrode active material may contain a precursor of the second negative electrode active material. The composition of the second negative electrode active material precursor can be represented by, for example, $SiO_z$ ($0.5 \leq Z \leq 1.5$). $SiO_z$ may contain a $SiO_2$ phase and silicon particles dispersed in the $SiO_2$ phase. The initial charge causes the $SiO_2$ phase to occlude lithium ions, producing the second lithium silicate phase. The second lithium silicate phase may be, for example, $Li_4SiO_4$. What is thereby formed is the second negative electrode active material that contains the second lithium silicate phase and the second silicon particles dispersed in the second lithium silicate phase.

The mass percentage of the first negative electrode active material relative to the total mass of the first negative electrode active material and the second negative electrode active material is 60% or less and may be more suitably 20% or less. The mixing of two types of negative electrode active materials enables improved cycle characteristics while increasing the initial discharge capacity of the secondary battery. As the first negative electrode active material and the second negative electrode active material occlude and release lithium ions at different times during charging and discharging, the above-described advantages are obtained by mixing these two types of negative electrode active materials at appropriate percentages. Also, as the first negative electrode active material and the second negative electrode active material have different hardnesses, an electric conduction path through the negative electrode active material can be maintained well by mixing them at the percentages described above.

The negative electrode active material may include, in addition to the first negative electrode active material and the second negative electrode active material, a material that is capable of occluding and releasing lithium ions, as a third negative electrode active material, such as a carbon material such as graphite (natural graphite or artificial graphite), a metal such as tin that forms an alloy with lithium, a metal compound that contains, for example, tin, or a non-carbon-based material such as a lithium titanium composite oxide. The third negative electrode active material is preferably graphite, as its volume change is small during charging and discharging. The percentage of the third negative electrode active material in the entire negative electrode active material may be in a range of for example, from 80% by mass to 95% by mass. If it is in this range, the volume change of the silicon-based negative electrode active material during charging and discharging can be made moderate, enabling improved cycle characteristics.

[Separator]

A porous sheet having ion permeability and insulating properties is used as the separator 13. Specific examples of the porous sheet include a microporous film, woven fabric, and non-woven fabric. Suitable examples of the material for the separator 13 include polyethylene, polypropylene, and other olefin resins and cellulose. The separator 13 may have either a single-layer structure or a multi-layer structure. The separator 13 may have a heat-resistant layer containing a heat-resistant material on its surface. Examples of the heat-resistant material include polyamide resins such as aliphatic polyamides and aromatic polyamides (aramid) and polyimide resins such as polyamideimides and polyimides.

[Non-Aqueous Electrolyte]

Examples that can be used as a non-aqueous solvent (organic solvent) for the non-aqueous electrolyte include carbonates, lactones, ethers, ketones, esters, and mixtures of two or more of these solvents. Examples that can be used as an electrolyte salt for the non-aqueous electrolyte include $LiPF_6$, $LiBF_4$, $LiCF_3SO_3$, and mixtures thereof. The amount of the electrolyte salt dissolved in the non-aqueous solvent can be, for example, 0.5 to 2.0 mol/L.

EXAMPLES

The present disclosure will be further described below using Examples, but the scope of the present disclosure is not limited to these Examples.

Example 1

[Synthesis of First Negative Electrode Active Material]

Silicon dioxide and lithium carbonate were mixed in a Si/Li molar ratio of 1.05, and the resulting mixture was calcined in air at 950° C. for 10 hours to obtain lithium silicate represented by $Li_2Si_2O_5$. The obtained lithium silicate was pulverized to an average particle size of 10 μm. Subsequently, $Li_2Si_2O_5$ and raw material silicon (3N, with an average particle size of 10 μm) were mixed in a mass ratio of 45:55. The resulting mixture was loaded into a pot (made of SUS, with a capacity of 500 mL) of a planetary ball mill (P-5 available from Fritsch), 24 SUS balls (with a diameter of 20 mm) were placed in the pot, the pot was closed with a lid, and the mixture was pulverized at 200 rpm in an inert atmosphere for 50 hours.

Next, the pulverized powdery mixture was taken out and placed in an inert atmosphere, where it was calcined at 800° C. for 4 hours under pressure applied using a hot press machine to obtain a sintered compact of the mixture. Subsequently, the sintered compact was pulverized and sieved through a 40 μm mesh, and then was mixed with coal pitch (MCP 250 available from JFE Chemical Corporation). The resulting mixture was calcined in an inert atmosphere at 800° C., thereby covering the surface with electrically conductive carbon to form a conductive layer. The covering amount of the conductive layer was 5% by mass relative to the mass of the first negative electrode active material. Subsequently, it was sifted through a sieve to obtain the first negative electrode active material having an average particle size of 5 μm and having a conductive layer on the surface.

The crystallite size of silicon particles in the first negative electrode active material was 15 nm. The first lithium silicate phase had an O/Si ratio of 2.5 and a Si/Li ratio of 1.0. In the first negative electrode active material, the content of the first lithium silicate phase $Li_2Si_2O_5$ was 45% by mass, and the content of the silicon particles was 55% by mass. It should be noted that the first negative electrode active material did not contain any of the above-described elements such as Na.

[Preparation of Second Negative Electrode Active Material Precursor]

SiO particles (with an average particle size of 5 μm) each having silicon particles dispersed in a $SiO_2$ phase were mixed with coal pitch (MCP 250 available from JFE Chemical Corporation). The mixture was calcined in an inert atmosphere at 800° C., thereby covering the surface of each of the SiO particles with electrically conductive carbon to form a conductive layer. The covering amount of the conductive layer was 5% by mass relative to the total mass of the SiO particle and the conductive layer. The SiO particles (second negative electrode active material precursor) having an average particle size of 5 μm with each particle having a conductive layer on the surface were obtained in this manner.

The first time charging causes the $SiO_2$ phase in the SiO particle to mostly become the second lithium silicate phase $Li_4SiO_4$, tuning the precursor into the second negative electrode active material that contains $Li_4SiO_4$ and silicon particles dispersed in $Li_4SiO_4$. In the second negative electrode active material after the first time charging, the content of $Li_4SiO_4$ was 42% by mass, and the content of silicon particles including lithium ions occluded therein was 58% by mass. It should be noted that the content of silicon particles except the lithium ions occluded therein was 29% by mass. It should be noted that the first negative electrode active material did not contain any of the above-described elements such as Na.

[Preparation of Negative Electrode]

By mixing 1 part by mass of the above-described first negative electrode active material, 4 parts by mass of the above-described second negative electrode active material precursor, and 95 parts by mass of graphite serving as the third negative electrode active material, a mixed negative electrode active material was obtained. Next, the mixed negative electrode active material, carbon nanotubes having a diameter of 1.2 nm to 2 nm, an average diameter of 1.6 nm, and a length of 5 μm, styrene-butadiene rubber (SBR), and sodium carboxymethylcellulose (CMC-Na) were given in a mass ratio of 100:0.01:1:1, and this mixture and a N-methyl-2-pyrrolidone (NMP) solution were kneaded together to prepare negative electrode mixture slurry. This negative electrode mixture slurry was applied to a copper negative electrode current collector, and after the applied film was dried, the applied film was rolled using a roller and cut into pieces of a predetermined electrode size to obtain a negative electrode having negative electrode mixture layers on both sides of the negative electrode current collector.

[Preparation of Positive Electrode]

A lithium nickel composite oxide ($LiNi_{0.8}Co_{0.18}Al_{0.02}$) was used as the positive electrode active material. This positive electrode active material, acetylene black, and polyvinylidene fluoride (PVdF) were mixed in a solid content mass ratio of 95:2.5:2.5, an appropriate amount of N-methyl-2-pyrrolidone (NMP) was added to this mixture, and then the resulting mixture was kneaded to prepare positive electrode mixture slurry. This positive electrode mixture slurry was applied to both sides of an aluminum positive electrode current collector, and after the applied film was dried, the applied film was rolled using a roller and cut into pieces of a predetermined electrode size to obtain a positive electrode having positive electrode mixture layers on both sides of the positive electrode current collector.

[Preparation of Non-Aqueous Electrolyte]

As an electrolyte salt, 1.0 mol/L of $LiPF_6$ was dissolved in a non-aqueous solvent containing ethylene carbonate (EC) and ethylmethyl carbonate (EMC) that were mixed in a volume ratio of 1:3 to prepare a non-aqueous liquid electrolyte which was a non-aqueous electrolyte that was in liquid form.

[Preparation of Battery]

An aluminum lead was attached to the above-described positive electrode, a nickel lead was attached to the above-described negative electrode, and the positive electrode and the negative electrode were spirally wound with a polyolefin separator therebetween and then pressed in the radial direction to prepare a flat wound electrode assembly. This electrode assembly was placed in an outer housing composed of an aluminum laminate sheet, the inside of the outer housing was filled with the above-described non-aqueous electrolyte, and then the opening of the outer housing was sealed to obtain a battery for evaluation.

Example 2

A battery was prepared in a similar manner to Example 1 except that in the preparation of the negative electrode, a mixed negative electrode active material was obtained by mixing 3 parts by mass of the first negative electrode active material, 3 parts by mass of the second negative electrode active material precursor, and 94 parts by mass of graphite serving as the third negative electrode active material.

Example 3

A battery was prepared in a similar manner to Example 1 except that in the preparation of the negative electrode, a mixed negative electrode active material was obtained by mixing 6 parts by mass of the first negative electrode active material, 4 parts by mass of the second negative electrode active material precursor, and 90 parts by mass of graphite serving as the third negative electrode active material.

Comparative Example 1

A battery was prepared in a similar manner to Example 1 except that in the preparation of the negative electrode, a mixed negative electrode active material was obtained by mixing 4.5 parts by mass of the first negative electrode active material, 2.5 parts by mass of the second negative electrode active material precursor, and 93 parts by mass of graphite serving as the third negative electrode active material.

Comparative Example 2

A battery was prepared in a similar manner to Example 1 except that in the preparation of the negative electrode, a mixed negative electrode active material was obtained by mixing 4 parts by mass of the second negative electrode active material precursor and 96 parts by mass of graphite serving as the third negative electrode active material.

For each of the above-described batteries, the initial discharge capacity and the capacity retention rate were evaluated using the following method. The initial discharge capacity is expressed as a relative value with the value in Comparative Example 1 being defined as 100. The capacity retention rate is expressed as a relative value with the value in Comparative Example 2 being defined as 1. Each of the batteries according to the Examples and the Comparative Examples was evaluated using the product of the initial discharge capacity and the capacity retention rate. Table 1 lists results of the evaluation along with the content of each of the first negative electrode active material and the second negative electrode active material as well as the mass percentage of the first negative electrode active material relative to the total mass of the first negative electrode active material and the second negative electrode active material.

[Measurement of Initial Discharge Capacity]

For each of the batteries according to the Examples and the Comparative Examples, the initial discharge capacity was measured under a temperature environment of 25° C. by charging the battery at a constant current of 0.05 C until the battery voltage reached 0 V and then discharging the battery at a constant current of 0.05 C until the battery voltage reached 1 V. It should be noted that the discharging here refers to discharging of the battery that is a combination of the negative electrode according to each of the Examples and the Comparative Examples and a commonly used positive electrode of, for example, $LiNiO_2$. This should be intrinsically referred to as charging as, in each of the batteries according to the Examples and the Comparative Examples, the negative electrode serves as a working electrode and metal lithium (Li) is used as a counter electrode; however, the opposite terms for charging and discharging directions are used to conform to the charging/discharging behavior of the negative electrode in a battery that is a combination of commonly used positive and negative electrodes. That is, charging is the action of causing a current to flow so that the electric potential of the negative electrode serving as the working electrode drops, and discharging is the action of causing a current to flow so that the electric potential of the negative electrode serving as the working electrode rises.

[Evaluation of Capacity Retention Rate After Cycle Test]

The above-described batteries in the initial state were subjected to the following cycle test. The discharge capacity in the first cycle and the discharge capacity in the 300th cycle in the cycle test were determined, and the capacity retention rate was calculated by the following equation:

Capacity retention rate (%)=(300th cycle discharge capacity/first cycle discharge capacity)×100

<Cycle Test>

The initial state batteries were first subjected to constant current charging at 0.05 C until the battery voltage reached a set voltage of 0 V and then subjected to constant current discharging at a constant current of 0.05 C until the battery voltage reached 1 V under a temperature environment of 25° C. This charging/discharging cycle was repeated 300 times.

larger values for the product of the initial discharge capacity and the capacity retention rate than the batteries according to the Comparative Examples. Although the first negative electrode active material provides a high capacity, an increase in its content tends to lower the capacity retention rate. However, the capacity retention rate equivalent to that in Comparative Example 2 was achieved in Example 1, and the cycle characteristics are inferred to be superior in a range in which the mass percentage of the first negative electrode active material relative to the total mass of the first negative electrode active material and the second negative electrode active material is 20% or less, as the capacity retention rate was substantially constant.

REFERENCE SIGNS LIST 10 secondary battery
11 positive electrode
12 negative electrode
13 separator
14 electrode assembly
15 outer housing
16 sealing assembly
17, 18 insulating plate
19 positive electrode lead
20 negative electrode lead
21 groove or inward projection
22 filter
23 lower vent member
24 insulating member
25 upper vent member
26 cap
26a opening
27 gasket
30 positive electrode current collector
31 positive electrode mixture layer
40 negative electrode current collector
41 negative electrode mixture layer

The invention claimed is:

1. A negative electrode for non-aqueous electrolyte secondary batteries comprising:
   a negative electrode current collector; and
   a negative electrode mixture layer formed on a surface of the negative electrode current collector, the negative electrode mixture layer containing a negative electrode active material and carbon nanotubes,
   wherein the negative electrode active material comprises a first negative electrode active material and a second negative electrode active material,

TABLE 1

| | Negative Electrode Active Material | | | | | Initial Discharge Capacity × |
|---|---|---|---|---|---|---|
| | First [g] | Second [g] | First/(First + Second) [%] | Initial Discharge Capacity | Capacity Retention Rate | Capacity Retention Rate |
| Example 1 | 1 | 4 | 20 | 94.9 | 1.00 | 94.9 |
| Example 2 | 3 | 3 | 50 | 99.4 | 0.96 | 95.4 |
| Example 3 | 6 | 4 | 60 | 103.5 | 0.91 | 94.1 |
| Comparative Example 1 | 4.5 | 2.5 | 64 | 100 | 0.92 | 92.0 |
| Comparative Example 2 | 0 | 4 | 0 | 93.9 | 1 | 93.9 |

As shown in Table 1, the batteries according to the Examples were found to be generally superior as they have wherein the first negative electrode active material comprises a first lithium silicate phase containing lithium, silicon, and oxygen, and first silicon particles dispersed in the first lithium silicate phase, satisfying a relationship $2<A1\leq 3$, where A1 represents the molar ratio of oxygen to silicon (O/Si) in the first lithium silicate phase, wherein the second negative electrode active material comprises a second lithium silicate phase containing lithium, silicon, and oxygen, and second silicon particles dispersed in the second lithium silicate phase, satisfying a relationship $3<A2\leq 4$, where A2 represents the molar ratio of oxygen to silicon (O/Si) in the second lithium silicate phase, wherein the carbon nanotubes have a diameter of 1 nm to 5 nm, and wherein the mass percentage of the first negative electrode active material relative to the total mass of the first negative electrode active material and the second negative electrode active material is 20% or less.

2. The negative electrode for non-aqueous electrolyte secondary batteries according to claim 1, wherein the first lithium silicate phase further contains at least one element selected from the group consisting of Na, K, Mg, Ca, Ba, Zr, Nb, Ta, V, Ti, P, Bi, Zn, Sn, Pb, Sb, Co, F, W, Al, La, and B.

3. The negative electrode for non-aqueous electrolyte secondary batteries according to claim 1, wherein the negative electrode mixture layer has a mass percentage of the carbon nanotubes of 0.005% to 0.05% relative to the mass of the negative electrode active material.

4. The negative electrode for non-aqueous electrolyte secondary batteries according to claim 1, wherein the carbon nanotubes have a length of 5 μm or greater.

5. A non-aqueous electrolyte secondary battery comprising:
the negative electrode for non-aqueous electrolyte secondary batteries according to claim 1;
a positive electrode containing a positive electrode active material; and
a non-aqueous electrolyte.

6. The non-aqueous electrolyte secondary battery according to claim 5, wherein the positive electrode active material contains a lithium transition metal oxide represented by a general formula $Li_aNi_xCo_yM_{1-x-y}O_{2-b}$ (where $0.97\leq a\leq 1.2$, $0.8\leq x\leq 1.0$, $0\leq y\leq 0.1$, $0\leq b<0.05$, and M includes at least one element selected from Ca, Mn, Al, B, W, Sr, Mg, Mo, Nb, Ti, Si, and Zr).

7. A negative electrode for non-aqueous electrolyte secondary batteries comprising:
a negative electrode current collector; and
a negative electrode mixture layer formed on a surface of the negative electrode current collector, the negative electrode mixture layer containing a negative electrode active material and carbon nanotubes, wherein the negative electrode active material comprises a first negative electrode active material and a second negative electrode active material, wherein the first negative electrode active material comprises a first lithium silicate phase containing lithium, silicon, and oxygen, and first silicon particles dispersed in the first lithium silicate phase, satisfying a relationship $2<A1\leq 3$, where A1 represents the molar ratio of oxygen to silicon (O/Si) in the first lithium silicate phase, wherein the second negative electrode active material comprises a second lithium silicate phase containing lithium, silicon, and oxygen, and second silicon particles dispersed in the second lithium silicate phase, satisfying a relationship $3<A2\leq 4$, where A2 represents the molar ratio of oxygen to silicon (O/Si) in the second lithium silicate phase, wherein the carbon nanotubes have a diameter of 1 nm to 5 nm, wherein the mass percentage of the first negative electrode active material relative to the total mass of the first negative electrode active material and the second negative electrode active material is 60% or less, and wherein the first lithium silicate phase further contains at least one element selected from the group consisting of Na, K, Mg, Ca, Ba, Zr, Nb, Ta, V, Ti, P, Bi, Zn, Sn, Pb, Sb, Co, F, W, Al, La, and B.

8. The negative electrode for non-aqueous electrolyte secondary batteries according to claim 7, wherein the negative electrode mixture layer has a mass percentage of the carbon nanotubes of 0.005% to 0.05% relative to the mass of the negative electrode active material.

9. The negative electrode for non-aqueous electrolyte secondary batteries according to claim 7, wherein the carbon nanotubes have a length of 5 μm or greater.

10. A non-aqueous electrolyte secondary battery comprising:
the negative electrode for non-aqueous electrolyte secondary batteries according to claim 7;
a positive electrode containing a positive electrode active material; and
a non-aqueous electrolyte.

11. The non-aqueous electrolyte secondary battery according to claim 10, wherein the positive electrode active material contains a lithium transition metal oxide represented by a general formula $Li_aNi_xCo_yM_{1-x-y}O_{2-b}$ (where $0.97\leq a\leq 1.2$, $0.8\leq x\leq 1.0$, $0\leq y\leq 0.1$, $0\leq b<0.05$, and M includes at least one element selected from Ca, Mn, Al, B, W, Sr, Mg, Mo, Nb, Ti, Si, and Zr).

* * * * *